(12) United States Patent
Suzuki

(10) Patent No.: US 12,481,338 B2
(45) Date of Patent: Nov. 25, 2025

(54) POWER STORAGE SYSTEM

(71) Applicant: MURATA MANUFACTURING CO., LTD., Kyoto (JP)

(72) Inventor: Yusuke Suzuki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 538 days.

(21) Appl. No.: 17/984,627

(22) Filed: Nov. 10, 2022

(65) Prior Publication Data

US 2023/0065241 A1    Mar. 2, 2023

Related U.S. Application Data

(63) Continuation of application No. PCT/JP2021/029478, filed on Aug. 10, 2021.

(30) Foreign Application Priority Data

Aug. 21, 2020  (JP) ................. 2020-140244

(51) Int. Cl.
  *G06F 1/26*    (2006.01)
  *H01M 10/42*   (2006.01)

(52) U.S. Cl.
  CPC ..... *G06F 1/263* (2013.01); *H01M 2010/4271* (2013.01); *H01M 2010/4278* (2013.01)

(58) Field of Classification Search
  CPC ... G06F 1/263; H01M 10/425; H01M 10/482; H01M 2010/4271; H01M 2010/4278; H02J 7/0014; H02J 7/00032; H02J 7/00034; H02J 7/0013; H02J 7/0029; H02J 7/0047; H02J 7/007; Y02T 10/7072; Y02T 90/12; Y02T 90/16; H04L 12/28; H04L 12/40

(Continued)

(56) References Cited

U.S. PATENT DOCUMENTS

| | | | |
|---|---|---|---|
| 2008/0315914 A1 | 12/2008 | Nam et al. | |
| 2014/0115191 A1* | 4/2014 | Kim | ...... G06F 13/362 |
| | | | 710/4 |

(Continued)

FOREIGN PATENT DOCUMENTS

| | | |
|---|---|---|
| JP | H09116565 A | 5/1997 |
| JP | 2020018153 A | 1/2020 |

OTHER PUBLICATIONS

International Search Report of corresponding PCT application PCT/JP2021/029478, dated Oct. 26, 2021.

*Primary Examiner* — Chun Cao
(74) *Attorney, Agent, or Firm* — K&L Gates LLP

(57) ABSTRACT

IDs are appropriately assigned to a plurality of slave devices. A power storage system includes: a master device including a first controller, and a pair of first communication terminals; and a slave device including a second controller, a pair of second communication terminals, and a battery unit, wherein the slave device includes a pair of first switches series-connected to the pair of second communication terminals; the pair of first communication terminals and the pair of second communication terminals are connected to each other; when the slave device is notified of a predetermined communication signal from the master device, the second controller controls and turns the pair of first switch from on to off; and the first controller assigns an ID to the slave device.

8 Claims, 8 Drawing Sheets

(58) Field of Classification Search
USPC .............................................................. 700/3
See application file for complete search history.

(56) References Cited

U.S. PATENT DOCUMENTS

| | | | |
|---|---|---|---|
| 2020/0169466 A1* | 5/2020 | Kim | H01M 10/4207 |
| 2020/0280460 A1* | 9/2020 | Fujita | G06F 13/4282 |
| 2022/0217118 A1* | 7/2022 | Hwang | H04L 61/5038 |
| 2022/0314832 A1* | 10/2022 | An | H02J 7/0047 |

* cited by examiner

POWER STORAGE SYSTEM

CROSS REFERENCE TO RELATED APPLICATIONS

The present application is a continuation of PCT patent application no. PCT/JP2021/029478, filed on Aug. 10, 2021, which claims priority to Japanese patent application no. JP2020-140244, filed on Aug. 21, 2020, the entire contents of which are incorporated herein by reference.

BACKGROUND

The present application relates to a power storage system.
In a system including a master device and a plurality of slave devices, an identifier (ID) is assigned to each slave device in order to manage the slave devices. A technique is described in which, in a system including a master unit and a plurality of slave units, all switches included in respective ones of the slave units are turned off in an initial state, and the switches are turned on in order from the switch to which an address corresponding to an ID is assigned, so that addresses are sequentially set in the slave units.

SUMMARY

The present application relates to a power storage system.
However, in the technique described in the Background section, it is necessary to turn off all the switches when setting the IDs; therefore, the IDs can be set only when the power is turned on, and therefore cannot be set at an arbitrary timing. In addition, it is considered that the setting of the IDs is ended when a predetermined time elapses after the power is turned on; therefore, there is a problem that it is not clear whether the setting of the IDs is appropriately performed. As described above, the technique described in the Background section is insufficient as a technique for setting IDs in slave devices.

Therefore, the present application relates to providing, in an embodiment, a power storage system capable of appropriately setting an ID in each of a plurality of slave devices.

A power storage system, in an embodiment, includes: a master device including a first controller, and a pair of first communication terminals; and a slave device including a second controller, a pair of second communication terminals, and a battery unit, wherein the slave device includes a pair of first switches series-connected to the pair of second communication terminals, the pair of first communication terminals and the pair of second communication terminals are connected to each other, when the slave device is notified of a predetermined communication signal from the master device, the second controller controls and turns the pair of first switch from on to off, and the first controller assigns an ID to the slave device.

The ID can be appropriately set in each of the plurality of slave devices. Note that the effects shown, as examples, in the present specification are not construed to be limited thereto.

DETAILED DESCRIPTION

Hereinafter, an embodiment of the present application will be described including with reference to the drawings. One or more embodiments described herein include preferred specific examples of the present application, and the content of the present application is not limited thereto.

Figure 1:
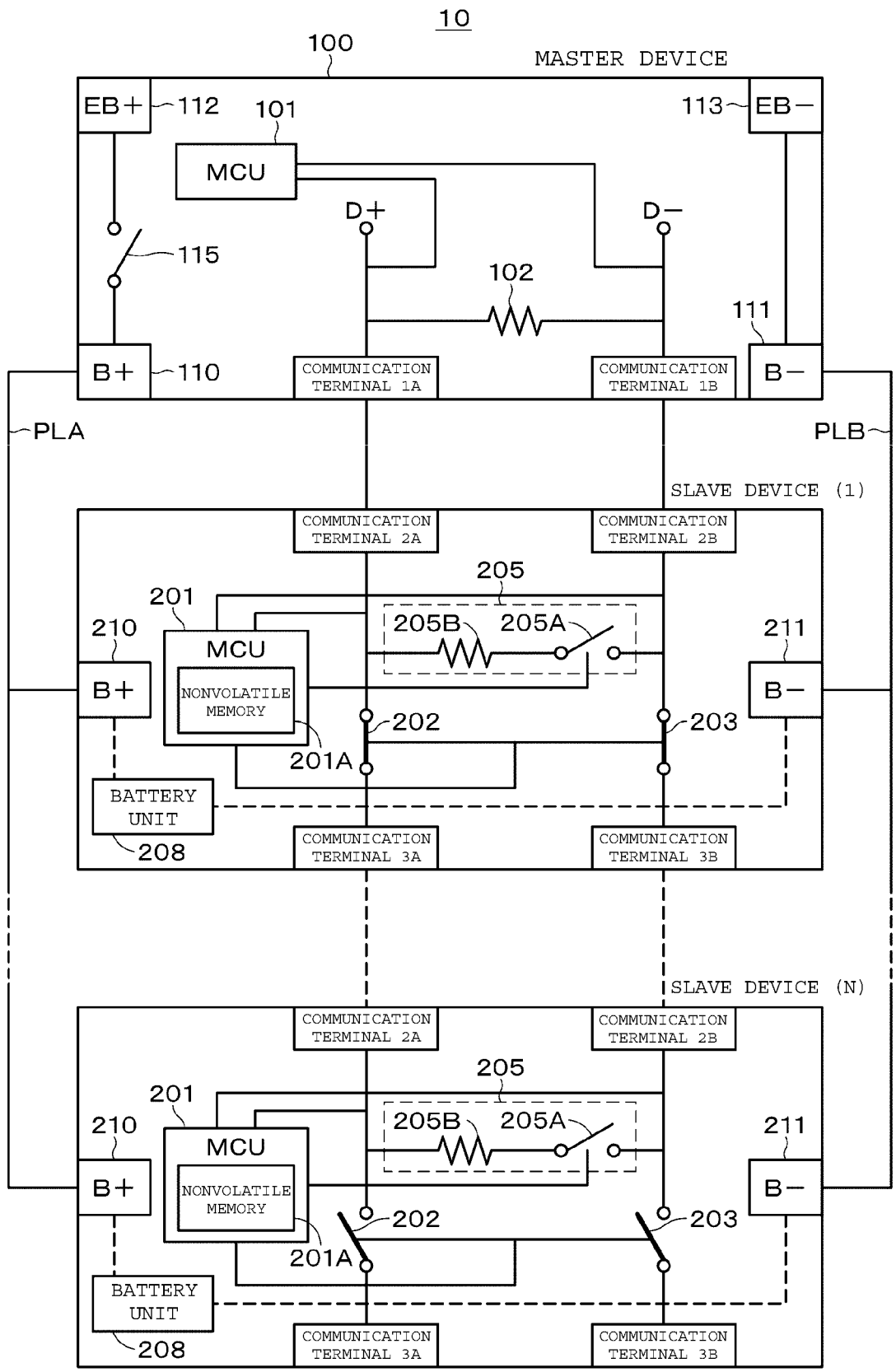
FIG. 1 is a diagram to be referred to when a description is given in relation to a configuration example of a power storage system according to an embodiment.

First, a configuration example of a power storage system (power storage system 10) according to an embodiment will be described with reference to FIG. 1. The power storage system 10 schematically includes one master device (master device 100) and N number of slave devices (slave device (1), slave device (2), . . . , slave device (N)) connected to the master device 100. Note that the number N is an integer of 1 or more. The value of N can be any value such as 16 or 32. When the individual slave devices are distinguished, they are each simply abbreviated as the slave device. In FIG. 1, the slave device (1) and the slave device (N) are shown.

In the following description, a connection position, to the master device 100, closer to the master device 100 is accordingly referred to as a higher level; a connection position, to the master device 100, farther from the master device 100 is accordingly referred to as a lower level; and the lowest level is appropriately referred to as a terminal end. In this example, the slave device (1) is the slave device located at the highest level among the N number of slave devices, and the slave device (N) is the slave device located at the lowest level, in other words, at the terminal end.

The master device 100 is, for example, a battery management unit (BMU), and the slave devices are, for example, power storage modules each including a battery unit (battery unit 208 to be described later). In this case, each slave device performs balance control between battery cells constituting the battery unit and processing of transmission of information, to the master device 100, such as cell voltages, a current flowing through the battery unit, and a temperature. The master device 100 performs the following operations, on the basis of information from the slave devices: control of turning on and off of charging and discharging; balance control between the slave devices; information transmission to a device at the higher level; and the like. The configuration of power storage system 10 is stored and held in a predetermined rack, for example.

Next, a detailed configuration example of the devices constituting the power storage system 10 will be described with reference to FIG. 1. First, a configuration example of the master device 100 will be described. The master device 100 includes: a micro control unit (MCU) 101 that is an example of a first controller; and communication terminals 1A and 1B that are a pair of first communication terminals. The MCU 101 integrally controls the operation of the master device 100. Further, the MCU 101 assigns an ID to each slave device connected to the MCU 101.

The communication terminal 1A is connected to a differential transmission line D+ for differential communication, and the communication terminal 1B is connected to a differential transmission line D− for differential communication. Differential signal communication is performed between the master device 100 and each slave device by using the differential transmission lines D+ and D−. Specifically, differential signal communication based on the controller area network (CAN), the RS485, or the like is performed. A differential signal is generated and output by the MCU 101. A termination resistor 102 equal to a characteristic impedance of the transmission line is connected between the differential transmission lines D+ and D−.

The master device 100 includes a positive electrode terminal (B+) 110 and a negative electrode terminal (B−) 111. The positive electrode terminal 110 and the negative electrode terminal 111 are connected to power lines for power transmission. Specifically, the positive electrode terminal 110 is connected to a power line PLA, and the negative electrode terminal 111 is connected to a power line PLB. The positive electrode terminal 110 is connected to an external positive electrode terminal (EB+) 112, and the negative electrode terminal 111 is connected to an external negative electrode terminal (EB−) 113. The external positive electrode terminal 112 and the external negative electrode terminal 113 are terminals connected to a charging device or a load. A switch 115 is connected between the external positive electrode terminal 112 and the positive electrode terminal 110. By turning on and off the switch 115, it is controlled whether to charge or stop the power from the charging device to the power storage system 10 or to supply or stop the power of the power storage system 10 to the load. The switch 115 is turned on and off by the MCU 101, for example.

Next, a configuration example of the slave device (1) will be described. The items described below are similarly applicable to the other slave devices. The slave device (1) includes: an MCU 201 that is an example of a second controller; communication terminals 2A and 2B that are a pair of second communication terminals; and communication terminals 3A and 3B that are a pair of third communication terminals.

The MCU 201 integrally controls the operation of the slave device (1). The MCU 201 includes a nonvolatile memory 201A. In the nonvolatile memory 201A, for example, the ID assigned to the slave device (1) and the termination information indicating the slave device to which termination setting has been made are written and stored. Although, in the example described above, the nonvolatile memory 201A is included in the MCU 201, the nonvolatile memory 201A may be mounted separately from the MCU 201.

The communication terminal 2A and the communication terminal 3A are connected to each other, and the communication terminal 2B and the communication terminal 3B are connected to each other. The slave device (1) includes a pair of first switches 202 and 203 series-connected to a pair of second communication terminals 2A and 2B. The first switches 202 and 203 are constituted by, for example, semiconductor switches capable of bidirectional communication, and have substantially the same electrical characteristics (electrical characteristics such as on-resistance). As the semiconductor switch capable of bidirectional communication, it is possible to use, for example, a semiconductor switch in which an n-channel MOSFET and a p-channel MOSFET are connected in parallel. In the case of using a one-directional switch instead of a bidirectional switch, an ON resistance is high or low depending on a communication direction, and the bidirectional communication cannot be normally performed. To address this issue, by using a semiconductor switch capable of bidirectional communication (a semiconductor switch in which an n-channel MOSFET and a p-channel MOSFET are connected in parallel), the ON resistance is lower in both directions, so that normal bidirectional communication is possible.

The first switch 202 is provided on a communication line connecting between the communication terminal 2A and the communication terminal 3A. The first switch 203 is provided on a communication line connecting between the communication terminal 2B and the communication terminal 3B. Turning on and off of the first switches 202 and 203 is controlled by the MCU 201. The MCU 201 is connected to a point between the communication terminal 2A and the first switch 202 and to a point between the communication terminal 2B and the first switch 203.

The slave device (1) includes a termination setting unit 205. The termination setting unit 205 is connected between a pair of communication lines connecting the first switches 202 and 203 and the communication terminals 2A and 2B. The termination setting unit 205 includes a termination resistor setting switch 205A and a termination resistor 205B that is a second switch, and the termination resistor setting switch 205A and the termination resistor 205B are series-connected to each other. Turning on and off of the termination resistor setting switch 205A is controlled by the MCU 201. Termination setting is performed by turning on the termination resistor setting switch 205A of the slave device at the terminal end in the power storage system 10. The termination resistor 205B preferably has a resistance equal to the characteristic impedance of the transmission line. The termination resistor setting switch 205A is constituted by, for example, a semiconductor switch capable of bidirectional communication, and has an on-resistance sufficiently smaller than the resistance value of the termination resistor 205B. As the semiconductor switch capable of bidirectional communication, it is possible to use, for example, a semiconductor switch in which an re-channel MOSFET and a p-channel MOSFET are connected in parallel.

The communication terminal 2A is connected to the communication terminal 1A of the master device 100, and the communication terminal 2B is connected to the communication terminal 1B of the master device 100. As a result, the slave device (1) can receive a notification (command) based on a differential communication signal from the master device 100. The notification from the master device 100 is input to the MCU 201. The MCU 201 performs control according to the notification.

Further, the communication terminal 3A and the communication terminal 3B are connected to the communication terminals 2A and 2B of slave device (2), which is one level lower than the slave device (1). As a result, the notification of the master device 100 is transmitted to the slave device at the lower level. Note that the communication terminals 3A and 3B of the slave device (N) on the terminal end are not connected to the other slave devices. As described above, the N number of slave devices are daisy-chained by using the communication terminals 2A and 2B and the communication terminals 3A and 3B. The communication terminals 1A, 1B, 2A, 2B, 3A, and 3B are terminals for differential communication.

The slave device (1) includes a battery unit 208, a positive electrode terminal (B+) 210, and a negative electrode terminal (B−) 211. The battery unit 208 includes one or a plurality of batteries (unit cells). As such batteries, lithium-ion batteries are used, but batteries other than lithium-ion batteries may be used. A positive electrode side of the battery unit 208 is connected to the positive electrode terminal 210, and a negative electrode side of the battery unit 208 is connected to the negative electrode terminal 211. The positive electrode terminal 210 is connected to the power line PLA. The negative electrode terminal 211 is connected to the power line PLB. As a result, power output from the N number of slave devices is supplied to the master device 100 through the power lines PLA and PLB, and the power supplied to the master device 100 is supplied to a load through the external positive electrode terminal 112 and the external negative electrode terminal 113. In the case of charging, power from a charging device is supplied to the master device 100 through the external positive electrode terminal 112 and the external negative electrode terminal 113, and the power supplied to the master device 100 is supplied to the N number of slave devices through the power lines PLA and PLB. In the power storage system 10 illustrated in FIG. 1, the N number of slave devices are connected in parallel; however, the N number of slave devices may be connected in series, or may be connected by a combination of series connection and parallel connection.

Figure 6:
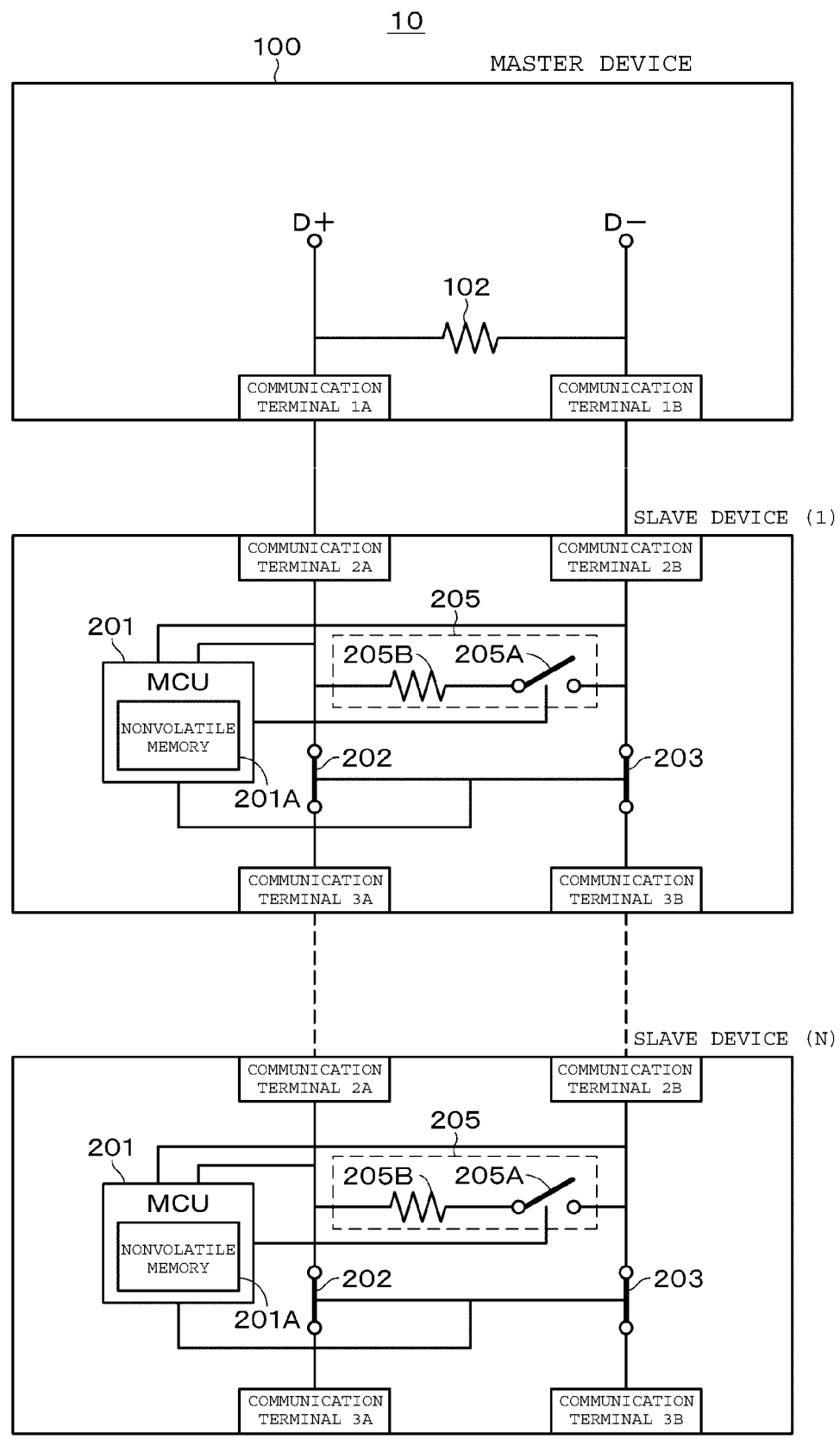
FIG. 6 is a diagram to be referred to when a description is given in relation to an operation example of a power storage system according to an embodiment.
Figure 7:
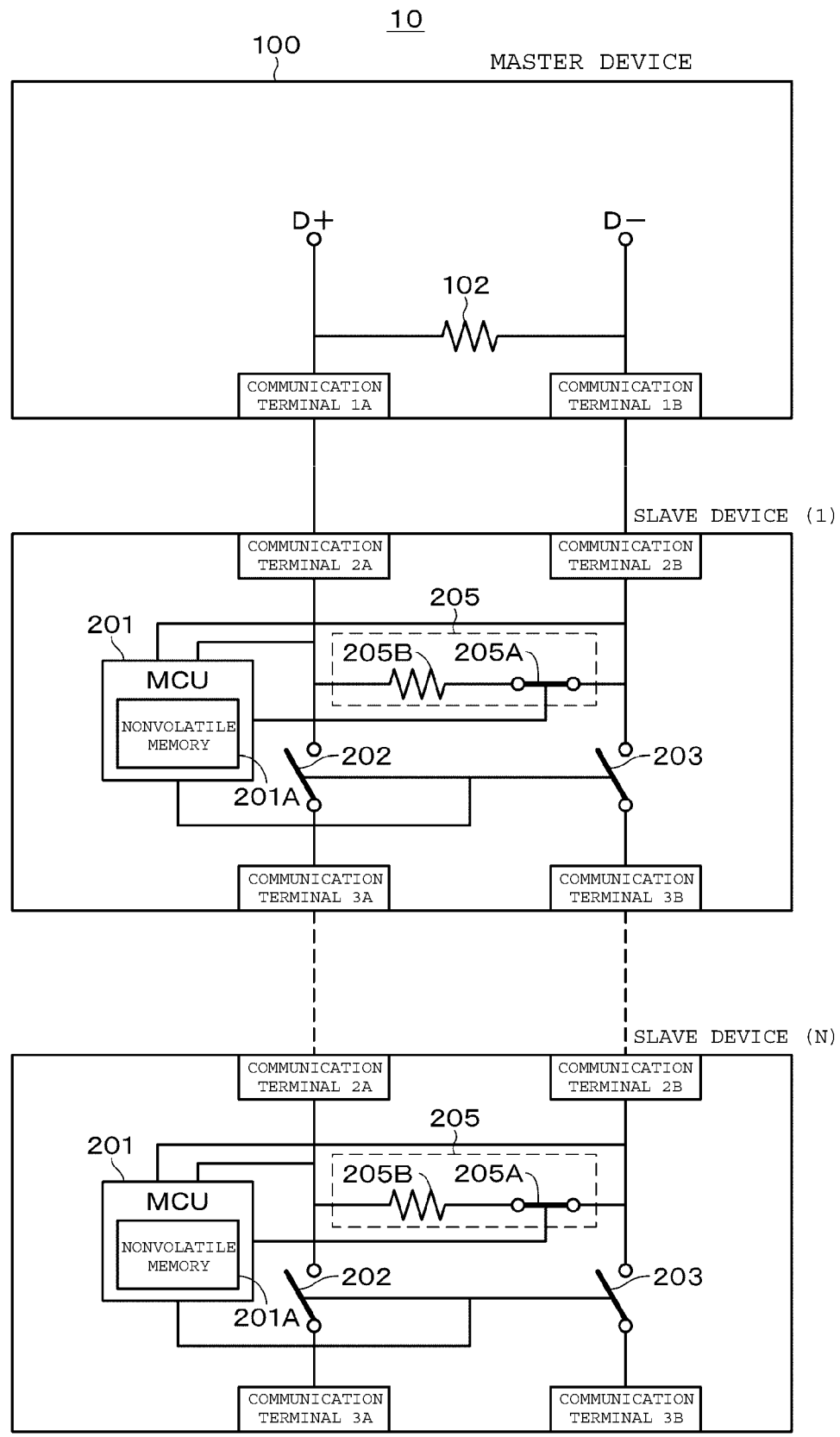
FIG. 7 is a diagram to be referred to when a description is given in relation to an operation example of a power storage system according to an embodiment.
Figure 8:
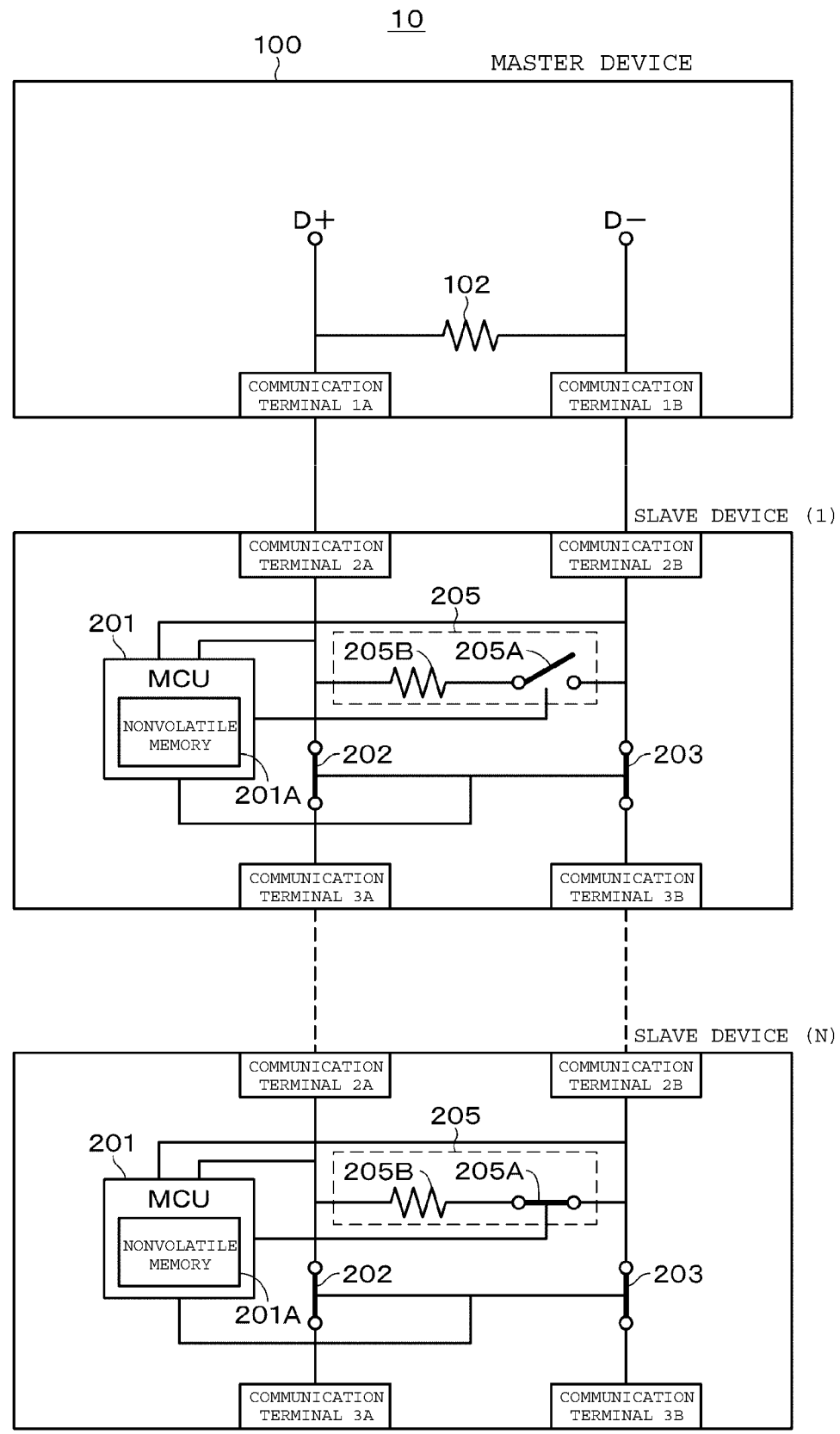
FIG. 8 is a diagram to be referred to when a description is given in relation to an operation example of a power storage system according to an embodiment.

Next, an operation example of the power storage system 10 will be described with reference to FIGS. 2 to 8. FIGS. 2 to 5 are sequence diagrams for describing an operation example of the power storage system 10. FIGS. 6 to 8 are diagrams for describing states of the respective ones of the switches during predetermined operation of the power storage system 10. Note that, the sequence is divided into FIGS. 2 to 5 for the convenience of space for illustration, but the sequence is actually a series of sequences performed continuously. As described above, the power storage system 10 includes the master device 100 and the N number of slave devices, but FIGS. 2 to 5 show a slave device (N+1) not connected to the power storage system 10. Furthermore, in FIGS. 6 to 8, some components (mainly power-related components) are not illustrated as appropriate.

Figure 2:
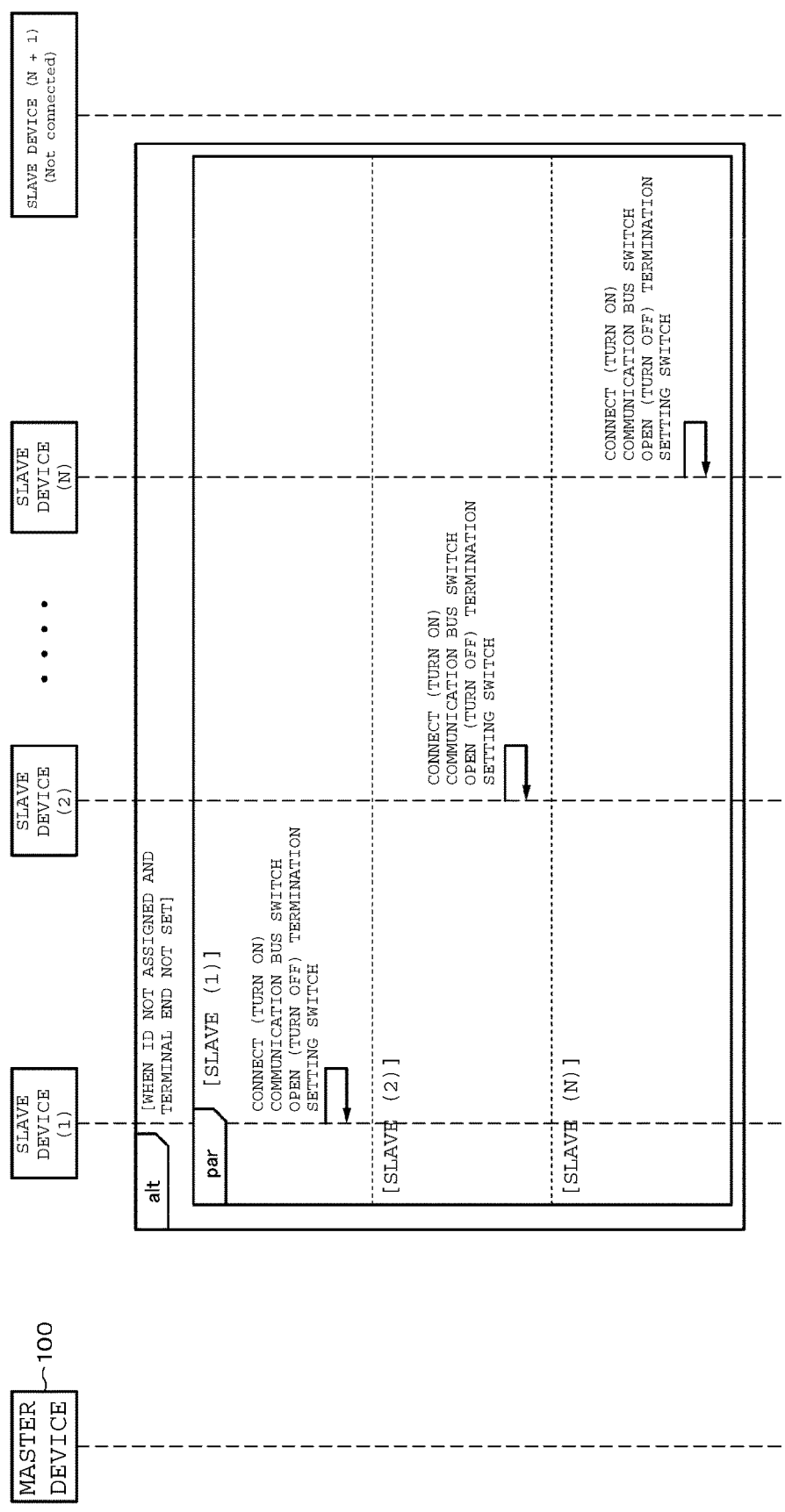
FIG. 2 is a sequence diagram to be referred to when a description is given in relation to an operation example of a power storage system according to an embodiment.

FIG. 2 illustrates an initial state. The initial state is a state in which an ID for each slave device is not assigned and the termination resistor is not set in the slave device at the lowest level (the termination resistor is not set). Note that the following state can also be an initial state: a state in which the IDs that have been once set are reset (including resetting of the termination resistor accompanying the resetting of the IDs).

Note that transmission of a notification performed from the master device 100 to the slave device, to be described below, is performed by using differential communication using the differential transmission lines D+ and D−. In addition, the processing on the master device 100 side is performed by the MCU 101 unless otherwise specified.

As illustrated in FIGS. 2 and 6, in the initial state, the first switches 202 and 203, which are communication bus switches, are turned on (connected), and the termination resistor setting switches 205A are turned off (opened). For example, before an ID assignment start command is transmitted from the master device 100 to the slave devices, the MCUs 201 control and turn on the first switches 202 and 203 and turn off the termination resistor setting switches 205A. Such turning on and off of each switch is the same in all the slave devices.

Figure 3:
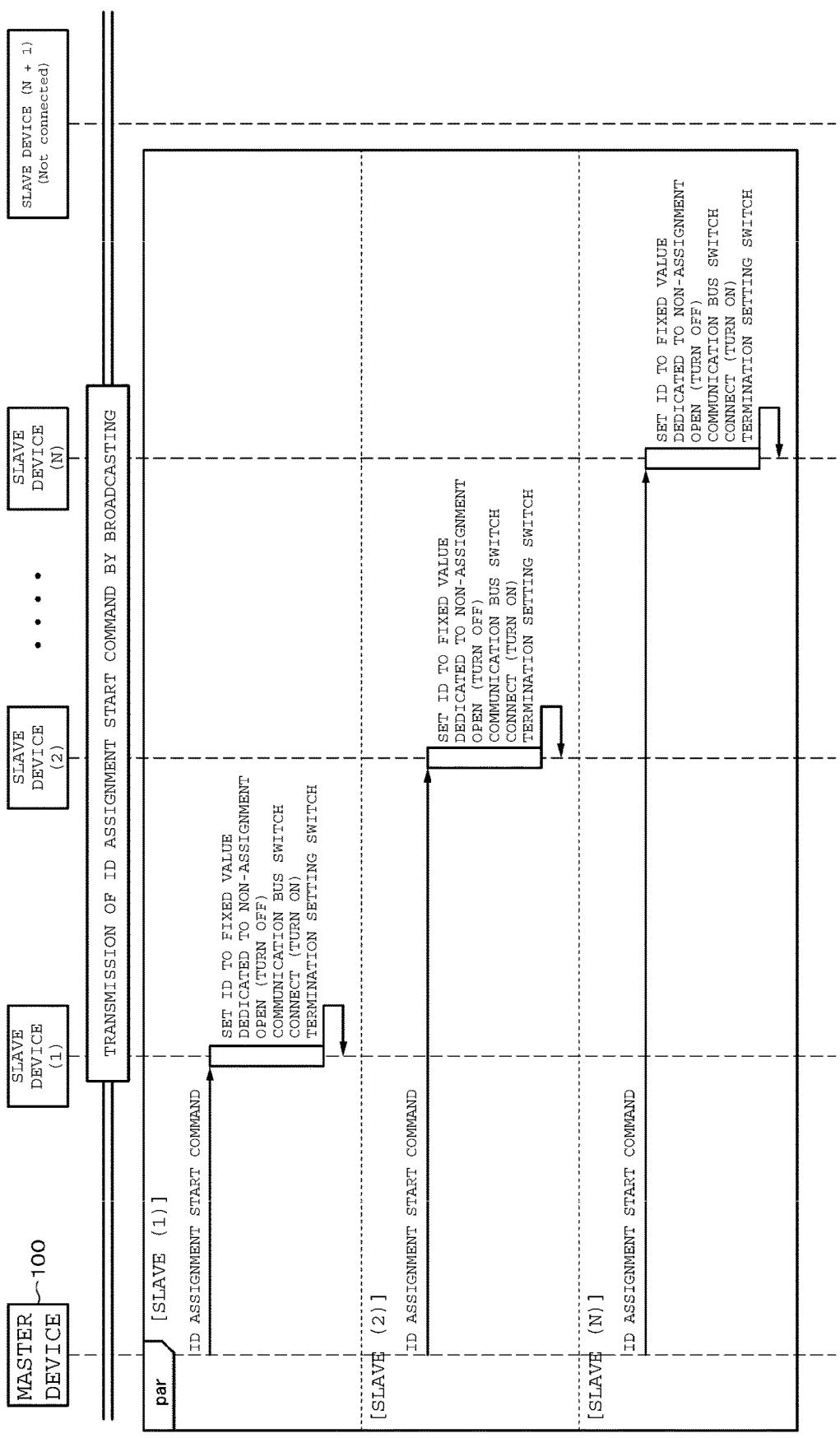
FIG. 3 is a sequence diagram to be referred to when a description is given in relation to an operation example of a power storage system according to an embodiment.

Next, the processing makes a transition to the process illustrated in FIG. 3. As illustrated in FIG. 3, the master device 100 notifies all the slave devices of the ID assignment start command by broadcasting. In the present embodiment, the ID assignment start command corresponds to one example of a predetermined communication signal. As illustrated in FIG. 6, since the first switches 202 and 203 of all the slave devices are turned on, it is possible to notify all the slave devices of the ID assignment start command.

Each slave device that has received an ID assignment start command performs the following process. The ID assignment start command is input to the MCU 201. The MCU 201 sets its own ID to a fixed value dedicated to non-assignment. Specifically, the MCU 201 stores the fixed value dedicated to ID-non-assignment in the nonvolatile memory 201A. The fixed value dedicated to non-assignment is a tentative ID and is a value common to all the slave devices. The fixed value dedicated to non-assignment may be included in the ID assignment start command, or may be set in the slave device in advance.

In addition, the MCU 201 turns off the first switches 202 and 203 and turns on the termination resistor setting switch 205A. As a result, as illustrated in FIG. 7, in each slave device, the first switches 202 and 203 are opened, and the termination resistor setting switch 205A is connected.

Figure 4:
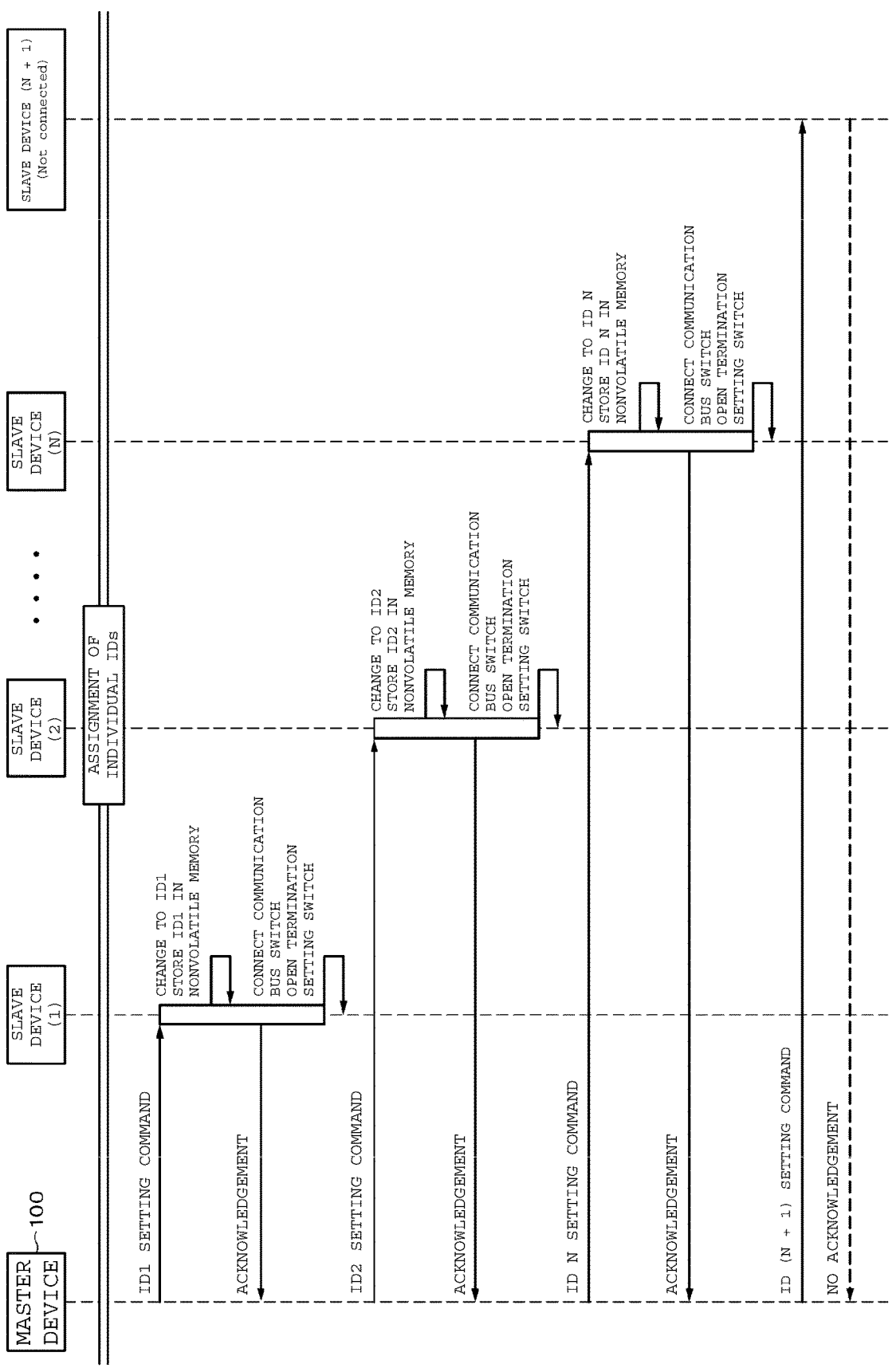
FIG. 4 is a sequence diagram to be referred to when a description is given in relation to an operation example of a power storage system according to an embodiment.

Next, a process of assigning individual IDs illustrated in FIG. 4 is performed. The IDs are each assigned in order from the slave device close to the master device 100 among the N number of slave devices. First, the master device 100 notifies the slave device (1) of an ID1 setting command. The ID1 setting command is input to the MCU 201 of the slave device (1). As described above, since the first switches 202 and 203 of the slave device (1) are turned off, the ID1 setting command is not transmitted to the slave devices at the lower levels than the slave device (1).

The MCU 201 of the slave device (1) to which the ID1 setting command has been input recognizes that ID1 is assigned to the slave device (1), and rewrites the fixed value dedicated to non-assignment stored in the nonvolatile memory 201A to ID1. Then, the MCU 201 transmits acknowledgement (ACK) to the master device 100. After the acknowledgement is completed, the MCU 201 turns on the first switches 202 and 203 and turns off the termination resistor setting switch 205A.

Upon receiving the acknowledgement from the slave device (1), the master device 100 notifies the slave device (2) of an ID2 setting command. Here, since the first switches 202 and 203 of the slave device (1) are turned on, the slave device (2) can be notified of the ID2 setting command. On the other hand, since the first switches 202 and 203 of the slave device (2) are turned off, the slave devices at the lower levels than the slave device (2) are not notified of the ID2 setting command. Furthermore, the slave device (1) in which ID1 is written in nonvolatile memory 201A ignores the ID2 setting command.

The MCU 201 of the slave device (2) performs a process similar to the process performed by the MCU 201 of the slave device (1). The MCU 201 of the slave device (2) to which the ID2 setting command has been input rewrites the fixed value dedicated to non-assignment stored in the nonvolatile memory 201A to ID2. Then, the MCU 201 transmits acknowledgement (ACK) to the master device 100. After the acknowledge, is completed, the MCU 201 turns on the switches 202 and 203 of the slave device (2) and turns off the termination resistor setting switch 205A.

After that, a similar process is repeated. At this stage, the master device 100 cannot determine whether the slave device at the terminal end is the slave device (N). To address this issue, after receiving the acknowledgement from the slave device (N), the master device 100 notifies the next slave device (N+1) of an ID(N+1) setting command. As described above, the slave device (N+1) is not connected to the power storage system 10. Therefore, acknowledgement is not transmitted to the master device 100 from the slave device (N+1). The master device 100 determines that the terminal slave device on the terminal end is the slave device (N) on the basis of the fact that the acknowledgement from the slave device (N+1) is not received for a predetermined time.

Figure 5:
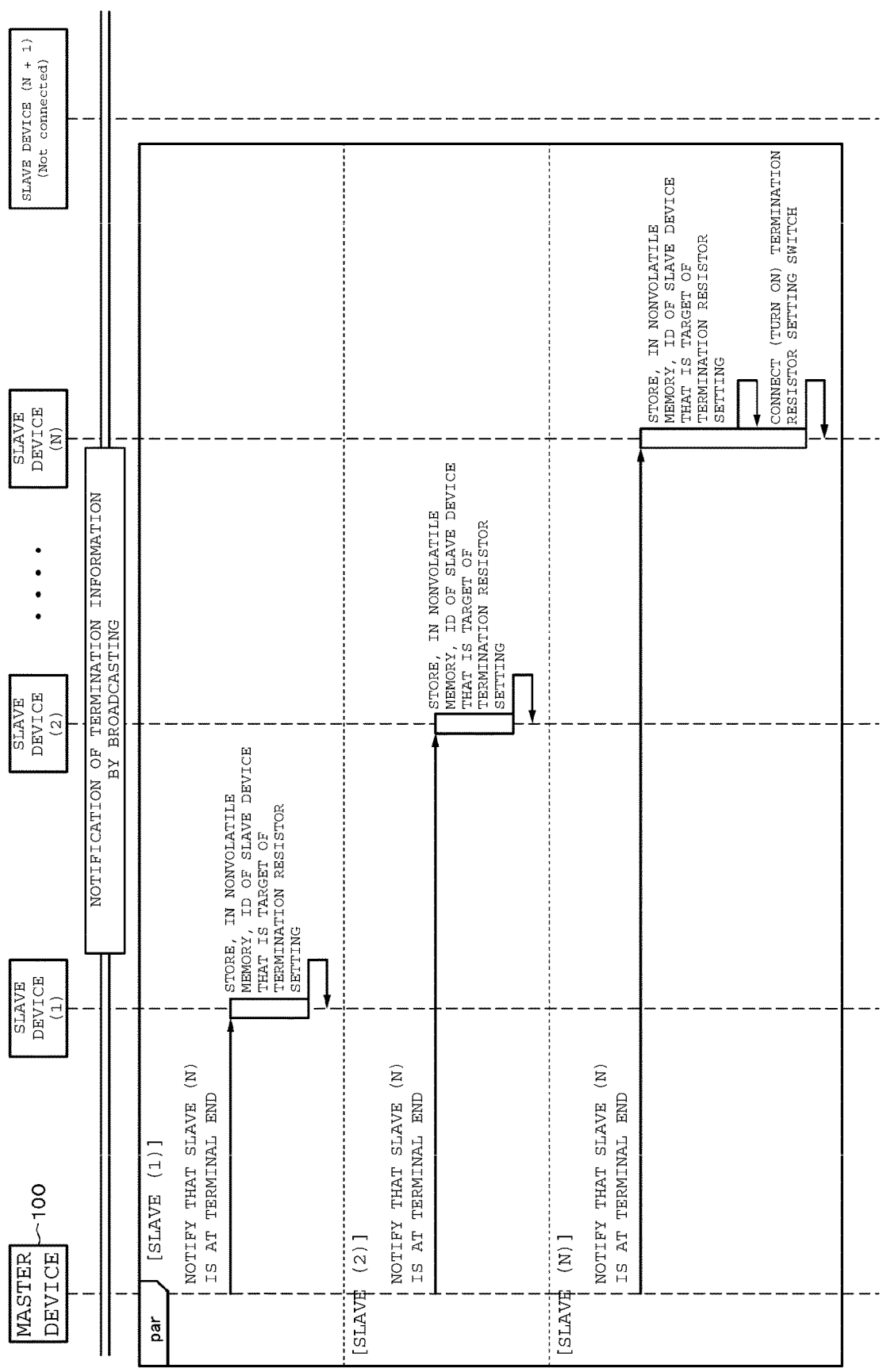
FIG. 5 is a sequence diagram to be referred to when a description is given in relation to an operation example of a power storage system according to an embodiment.

Then, the process makes a transition to the process illustrated in FIG. 5. After it is determined that the slave device at the terminal end is the slave device (N), the slave devices are notified of the termination information, which represents that the slave device that is a target of termination resistor setting is the slave device (N). All the slave devices are notified of the termination information by broadcasting.

The MCUs 201 of the slave devices (the slave device other than the slave device at the terminal end) that have received the termination information store the termination information, in other words, the ID N of the slave device that is the target of the termination resistor setting, in the nonvolatile memories 201A. In addition, the MCU 201 of the terminal slave device on the terminal end (the slave device (N) in this example) that has received the termination information stores the termination information in the nonvolatile memory 201A, and performs termination setting by turning on the termination resistor setting switch 205A. By the above process, as shown in FIG. 8, the termination setting in the power storage system 10 is appropriately performed.

The above-described operation of assigning IDs to respective ones of the slave devices may be started when the master device 100 notifies each slave device of an ID assignment start command while the master device 100 and each slave device is operating.

According to an embodiment, the following effects can be obtained, for example.

The ID can be appropriately set in each of the plurality of slave devices. Since a manual operation of a worker (operator) is not involved in the setting of an ID, an artificial ID setting error can be prevented. The IDs are set in order of distance from the slave device close to the master device, and the slave device at the lowest level is terminated, so that the worker can easily intuitively recognize the assigned ID. Since all the slave devices are notified of the termination information, it is possible to clarify that the termination setting has been performed.

The termination resistor can be appropriately set. Similarly to the assignment of the IDs, since no manual works of a worker are involved, it is possible to prevent an artificial termination setting error. It is possible to prevent or reduce deterioration of communication quality due to an influence of reflection noise. Meanwhile, a technique itself for automatically setting the termination resistor is proposed (see, for example, Japanese Patent Application Laid-Open No. 2010-247969). However, the present application, in an embodiment, makes it possible to appropriately assign IDs in a plurality of slave devices and, at the same time, to perform termination setting on the slave device at the lowest level. For example, in the technique described in Japanese Patent Application Laid-Open No. 2010-247969, an ID needs to be previously assigned to a target of termination setting. As described above, in order to appropriately assign IDs to a plurality of slave devices and perform termination setting on the slave device at the lowest level, it is necessary to perform the process according to an embodiment, and a simple combination of conventional techniques cannot make it possible.

In an embodiment, in a default state, in other words, in the initial state, all the slave devices are connected to the master device. Therefore, since the ID assignment start command can be transmitted from the master device 100 to all the slave devices by broadcasting at an arbitrary timing, it is possible to automatically assign IDs and automatically set a termination resistor at an arbitrary timing. For example, when, in a state where a plurality of slave devices are connected in parallel, one slave device has been separated from the power storage system due to a failure or the like, it is possible to automatically assign a new ID to each slave device newly constituting the power storage system and to automatically set a termination resistor, by notifying of ID assignment start commands. Similarly, also, when a slave device is added, automatic assignment of a new ID and automatic setting of a termination resistor can be performed on each slave device including the added slave device. As described above, in an embodiment, the timing at which automatic assignment of an ID or the like is performed is not limited to a specific timing such as when the power is turned on.

In addition, in an embodiment, each slave device stores, in its own nonvolatile memory, the ID set in itself and the ID of the slave device on which termination setting has been performed. Accordingly, when there is no such a change in the configuration of the power storage system as a change in the number of slave devices, it is not necessary to reassign the IDs or to reset the termination resistor. For example, also, when the power storage system is restarted, it is not necessary to reassign the IDs or reset the termination resistor.

In addition, switches (first switches 202 and 203) having substantially the same electrical characteristics such as on-resistance are respectively disposed on the D+ side and the D− side of the differential transmission line. As a result, if noise is mixed into the differential transmission line, the noise is canceled on the reception side (slave device side), so that noise resistance can be improved.

Although an embodiment of the present application has been described above, the content of the present application is not limited thereto, and various modifications are possible.

In an embodiment described above, termination setting is not yet completed when the ID assignment start command and the termination information are communicated. Therefore, if the ID assignment start command and the termination information are transmitted by high-speed differential communication, there is a possibility that the ID assignment start command and the termination information cannot be appropriately communicated due to an influence of reflection noise. Therefore, the master device 100 may perform control of notification of the ID assignment start command and the termination information at a communication speed lower than such a predetermined speed that will not cause an influence of reflection noise.

On the other hand, since the termination setting has been performed on the slave device on the reception side, the ID setting command can be transmitted at a normal communication speed, in other words, at a high communication speed (see FIG. 4). Here, notification of the ID(N+1) setting command which is the last ID setting command illustrated in FIG. 4 is communicated in a state where there is no corresponding slave device, in other words, in a state where termination setting is not performed. However, since the slave device (N+1) is not connected to the power storage system 10, an acknowledgement is not transmitted to the master device 100 from the slave device (N+1) regardless of the presence or absence of the influence of reflection noise. Therefore, when the ID(N+1) setting command is transmitted from the master device 100, it is not necessary to reduce the communication speed in consideration of the influence of reflection noise. As a result, the MCU 101 of the master device 100 may control such that a communication speed at the time of notification of the ID assignment start command and notification of the termination information is lower than the communication speed at the time of ID assignment, in other words, the communication speed at the time of notification of the ID setting command. In one example, the communication speed at the time of notification of the ID assignment start command and notification the termination information is 9600 bps (bits per second), and the communication speed at the time of notification of the ID setting command is 115200 bps.

In an above-described embodiment, the ID assigned to each individual slave device can have any value. As long as each slave device can be identified, the IDs do not need to be in order from the slave device at the higher level. In addition, in a configuration in which a differential communication signal is input to the MCU, a transceiver may be provided as necessary. In addition, a worker may be notified of completion of ID assignment and termination setting.

The items described in an embodiment including modifications can be appropriately combined. In addition, the materials, the processes, and the like described in an embodiment are merely examples, and the content of the present application is not limited thereto.

DESCRIPTION OF REFERENCE SYMBOLS

10: Power storage system
1A, 1B: Pair of first communication terminals
2A, 2B: Pair of second communication terminals
3A, 3B: Pair of third communication terminals
100: Master device
101: MCU (first controller)
(1) to (N+1): Slave device
201: MCU (second controller)
201A: Nonvolatile memory
202, 203: Pair of first switches
205: Termination setting unit
205A: Termination resistor setting switch
205B: Termination resistor It should be understood that various changes and modifications to the presently preferred embodiments herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A power storage system comprising:
a master device including a first controller, and a pair of first communication terminals; and
a slave device including a second controller, a pair of second communication terminals, and a battery unit, wherein
the slave device includes a pair of first switches series-connected to the pair of second communication terminals,
the pair of first communication terminals and the pair of second communication terminals are connected to each other,
when the slave device is notified of a predetermined communication signal from the master device, the second controller controls and turns the pair of first switch from on to off, and the first controller assigns an ID to the slave device,
wherein the slave device includes a pair of third communication
terminals, and
N number of the slave devices are daisy-chained by the second communication terminals and the third communication terminals,
wherein in response to notification of the predetermined communication signal from the master device to the N number of slave devices,
the second controller controls and turns the pair of first switches from on to off, and
the first controller sequentially assigns IDs to respective ones of the N number of slave devices in order from the slave device close to the master device, and the second controller of the slave device to which the ID is assigned controls the pair of first switches from off to on, and
wherein the power storage system further including a pair of communication lines each provided between one of the pair of first switches and corresponding one of the pair of second communication terminals,
wherein
a termination setting unit including a second switch and a resistor is connected between each of the pair of communication lines,
in response to notification of the predetermined communication signal from the master device to the N number of slave devices, the second switches are controlled to turn from off to on,
after an ID is assigned to one of the slave devices, the second switch is controlled to turn from on to off, and
when the Nth slave device is notified, from the first controller, of termination information indicating that the Nth slave device is at a terminal end, the second switch of the Nth slave device is controlled to turn from off to on to perform termination setting on the Nth slave device.

2. The power storage system according to claim 1, wherein the termination information is notified to all of the N number of slave devices.

3. The power storage system according to claim 1, wherein the first controller sets a communication speed at a time of notification of the predetermined communication signal and notification of the termination information to be lower than a communication speed at a time of assignment of the ID.

4. The power storage system according to claim 1, wherein the pair of first communication terminals, the pair of second communication terminals, and the pair of third communication terminals are terminals used for differential communication.

5. The power storage system according to claim 1, wherein the slave devices each includes a nonvolatile memory that stores the assigned ID and/or the termination information.

6. The power storage system according to claim 1, wherein operation of assigning the ID is started when the master device has notified the slave device of the predetermined communication signal in a state where the master device and the slave device are operating.

7. The power storage system according to claim 1, wherein each of the pair of first switches includes a
   semiconductor switch, and
   the semiconductor switches have substantially identical electrical characteristics.

8. The power storage system according to claim 1, wherein the second controller controls and turns the pair of first switches to on in a state before the predetermined communication signal is transmitted from the master device to the slave device.

* * * * *